United States Patent [19]

Stumpf

[11] 3,944,055

[45] Mar. 16, 1976

[54] END MEMBER FOR DRIVEN ROLLERS OF ROLLER CONVEYORS

[76] Inventor: Karl Stumpf, Goethestrasse 1, 4 Dusseldorf, Germany

[22] Filed: July 12, 1974

[21] Appl. No.: 488,260

[30] Foreign Application Priority Data

July 23, 1974 Germany............... 7325970[U]

[52] U.S. Cl.............................................. 198/127 R
[51] Int. Cl.²........................................... B65G 13/04
[58] Field of Search............... 198/127 R, 202, 184

[56] References Cited
UNITED STATES PATENTS

| | | | |
|---|---|---|---|
| 2,976,981 | 3/1961 | Peras................................ | 198/127 R |
| 3,173,346 | 3/1965 | Zernov et al..................... | 198/127 R |
| 3,567,010 | 3/1971 | Stein................................ | 198/127 R |
| 3,610,406 | 10/1971 | Fleischauer...................... | 198/127 R |

*Primary Examiner*—James B. Marbert
*Attorney, Agent, or Firm*—Roylance, Abrams, Berdo & Kaul

[57] ABSTRACT

An integrally formed, molded plastic end member for a conveyor roller having a cylindrical portion insertable in a roller tube and a portion protruding from the end with a shoulder formed on the outside to limit insertion. The insertable portion has an inner sleeve loosely surrounding a supporting shaft, an outer sleeve which fits into the tube, and radial webs connecting the two sleeves. The protruding portion has one or more gear rings formed on the outside of an outer sleeve and an inner sleeve which defines a cavity to receive a ball bearing outer race, the inner race thereof surrounding the shaft. The protruding portion also has webs extending between the inner and outer sleeves. Two rings supported on the shaft and inner sleeve, respectively, form a labyrinth seal to protect the ball bearing.

5 Claims, 2 Drawing Figures

U.S. Patent   March 16, 1976   3,944,055
Fig. 1
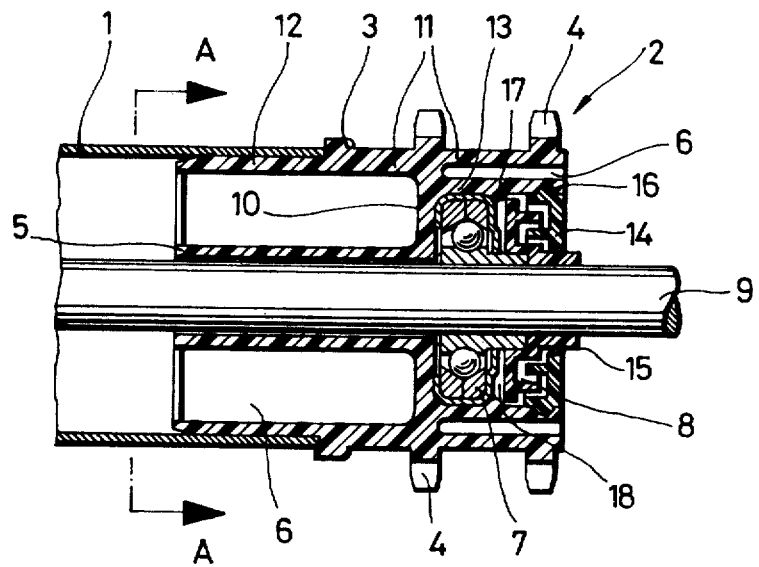
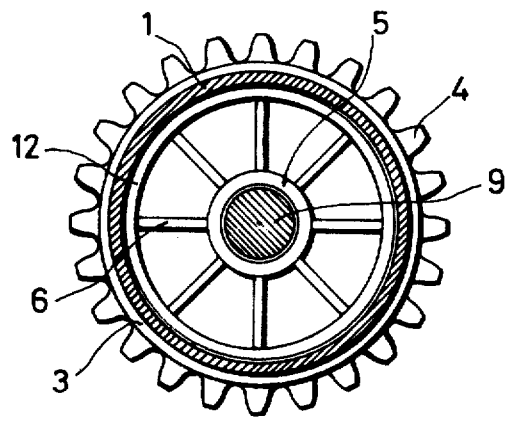
Fig. 2

END MEMBER FOR DRIVEN ROLLERS OF ROLLER CONVEYORS

The invention relates to roller conveyors, and is more particularly in the field of driven rollers for such conveyors.

Known rollers of this kind have for example roller bearings at their ends, on which they are running on a shaft fixedly mounted in the conveyor structure. The rollers may be driven by endless chains. Each roller has end members to which gears or gear rings are fastened. Usually there is a pair of gear rings mounted side by side on the end member. The chains connect alternatively the inner gear rings of adjacent rollers and the outer gear rings of the next adjacent rollers. The gear rings are separate parts, which must be protected against being drawn off from the end members. This is particularly the case if the driven rollers are used in curves, because then the chains exert an axial force component. The protection of the gear rings is obtained by mechanical means, for example fastening pins or by separate parts abutting at the outer gear rings and being fixed to the end members on their part.

The assembly of these rollers is time-consuming. The several separate parts, which are made from plastic material, require a corresponding number of expensive molds.

It is an object of the invention to provide a simpler driven roller for roller conveyors.

Another object is to provide an end member for driven rollers for which no separate parts have to be produced and assembled.

A still further object of the invention is to provide a particularly rigid end member, in which the stability of the mounting of the gear rings does not depend on additional mechanical members.

These and other objects will become more apparent from the following specification and attached drawings, in which:

FIG. 1 is a partial longitudinal section to the end part of a conveyor roller; and FIG. 2 is a cross-section along the line A-A in FIG. 1.

In FIG. 1 2 generally designates an end member for a roller of roller conveyors. The end member 2 is of essentially cylindrical shape and is fittingly inserted with an end portion 12 into a tube 1, which is the transporting part of the roller. The depth of insertion is limited by a shoulder 3. Outside the tube 1 the end member 2 comprises a protruding portion 11, on the circumference of which there are two gear rings 4, at which the drive chains (not shown) will engage.

The end member 2 contains a cylindrical chamber 18, adapted to receive a ball bearing 7, by which the end member 2 is supported on the shaft 9, which extends longitudinally through the center of the tube 1 and is fixedly mounted on its ends in the conveyor structure.

In the central portion the end member 2 has a transverse wall 10, from which a first sleeve 5 axially extends. The sleeve 5 embraces the shaft 9 with some clearance so that the end member 2 is only supported on the ball bearing 7. To the other side of wall 10 extends axially a second sleeve 13, which radially confines the chamber 18.

As the sleeves 5,13 have radial distance to the outer portions 12,11 of the end member 2, there are rigidifying webs 6, which are provided in axial planes and extending radially between the sleeves 5,13 and the portions 12,11. In the embodiment shown there are eight webs uniformly distributed about the circumference.

The ball bearing 7 is held in place by a rib 17. The ball bearing 7 is sealed against the outside by two rings 14 and 15 cooperating to form a labyrinth seal. The outer ring 14 is held in place by a circumferential rib 16 engaging a corresponding groove in the sleeve 13.

The end member 2 is made as a whole by one-piece molding from plastic. The gear rings correspondingly are unitary with the rest of the end member 2. No problems arise with the mounting of separate gear rings to the end member 2. The whole structure of the end member is relatively thin-walled and material-saving but nevertheless, due to the provision of the sleeves 5,13 cooperating with the webs 6 and supporting the outer portion 12,11 of the end member, very rigid, so that no deformations of the end member 2 will occur, which otherwise might cause an uneven running of the tube 1.

While there has been shown one embodiment of the invention, it will be understood that various omissions and modifications of the end member illustrated may be made by those skilled in the art without departing from the spirit of the invention, which is to be limited only as indicated by the scope of the following claims.

I claim:

1. An end member for a driven roller for a roller conveyor, the roller being of the type having a center shaft and a tube mounted for rotation about the shaft, the end member comprising a generally cylindrical body having a first portion to be inserted into an end of the tube and a second portion outside of the tube,
   said first portion including an outer sleeve dimensioned to frictionally fit the interior of the tube, an inner sleeve surrounding the center shaft, said inner sleeve being spaced from said shaft and from said outer sleeve, and radial web means interconnecting said inner and outer sleeves;
shoulder means integrally formed on the exterior of said body between said inner and outer portions thereof for limiting the insertion of said body into said tube;
at least one gear ring integrally formed on said second portion of said body outside of the tube, said gear ring being axially spaced from said shoulder means;
an antifriction bearing having an outer race and an inner race, said inner race being insertable over the center shaft of said roller; and
means defining a chamber in said second portion of said body for receiving and retaining said outer race.

2. An end member according to claim 1 wherein the end member including the gear ring is integrally formed from plastic by one-piece molding.

3. An end member according to claim 1 wherein said second portion of said body includes two gear rings in side-by-side axially spaced relationship.

4. A end member according to claim 1 wherein said means defining a chamber includes
a third sleeve coaxially surrounding said shaft and radially outwardly spaced therefrom to define the outer radial limit of said chamber;
said second portion further comprising a fourth sleeve coaxial with said third sleeve and radially outwardly spaced therefrom and a plurality of radially extending equally spaced webs lying in axial planes interconnecting said third and fourth sleeves.

5. An end member according to claim 4 and including a transverse annular wall extending across the interior of said body, said inner, outer, third and fourth sleeves extending axially from said wall.

* * * * *